Jan. 6, 1959     A. L. HUEHNEL     2,867,681
WIRING DUCT
Filed Feb. 18, 1955
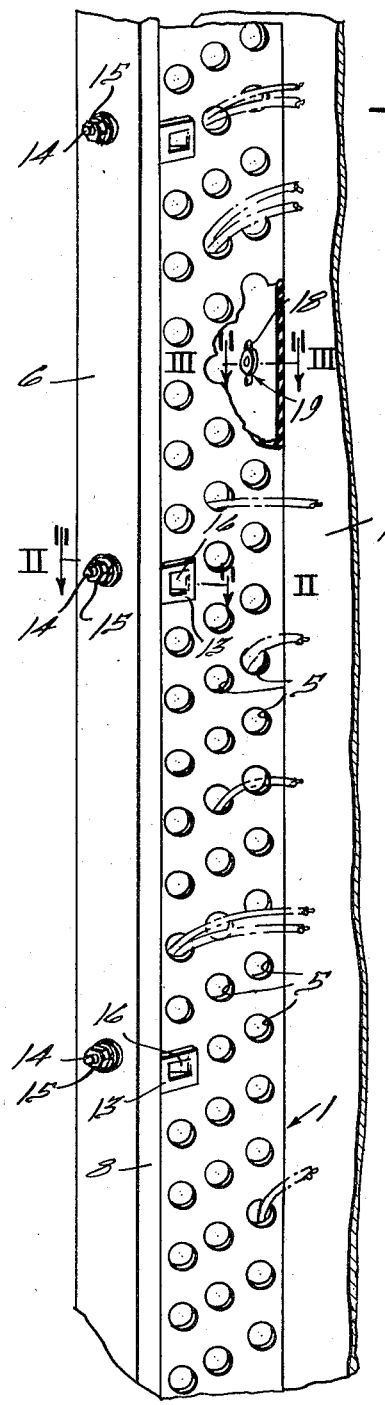
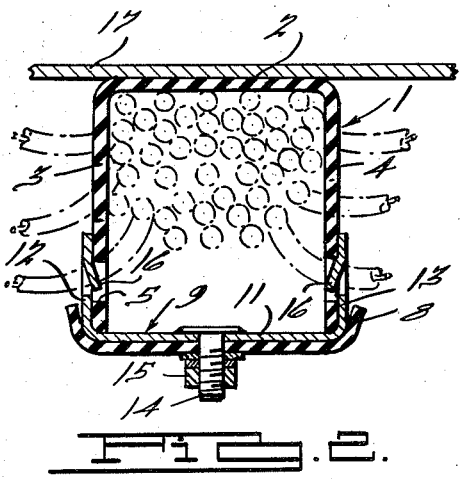
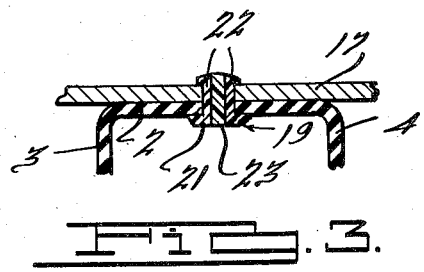
INVENTOR.
Alwin Leopold Huehnel
BY
Myron J. Seibold
ATTORNEY.

2,867,681
Patented Jan. 6, 1959

2,867,681
WIRING DUCT

Alwin Leopold Huehnel, Milwaukee, Wis., assignor to Square D Company, Detroit, Mich., a corporation of Michigan Application February 18, 1955, Serial No. 489,079

5 Claims. (Cl. 174—101)

This invention relates to a wiring duct for the reception of circuit wiring and more particularly to an insulated wiring duct primarily used in control panels and similar devices for the reception of internal wiring of the panel.

Another object of the invention is the provision of an improved cover mounting arrangement for a wiring duct including a channel of insulating material.

Another object of the invention is the provision of a wiring duct of the class described having improved means for mounting the duct to a support.

Other objects and features of the invention will be readily apparent to those skilled in the art from the specification and appended drawing illustrating certain preferred embodiments in which:

Figure 1 is a perspective view showing part of a wiring duct according to the present invention.

Figure 2 is a transverse sectional view on the line II—II of Figure 1.

Figure 3 is a detail sectional view through the line III—III of Figure 1.

The wiring duct according to the present invention is illustrated as comprising an elongated channel body portion 1, U-shaped in cross section and having a bight 2 and legs 3 and 4. This channel shaped body portion is preferably formed of fiber or plastic insulating material having at least a limited inherent resilience. The opposite legs 3 and 4 of the wiring duct channel are provided with a multiplicity of openings 5, more particularly shown in Figure 1, through which the circuit controlling wiring received within the duct may have passage. A cover 6 is provided for the duct and this is also preferably of insulating material such as fiber or plastic and is also U-shaped in cross section with short legs 7 and 8 which embrace the ends of legs 3 and 4 of the channel.

Upon the inner surface of the cover 6 are mounted a plurality of U-shaped metal mounting brackets 9 having bights 11 and legs 12 and 13. The bights 11 of the brackets 9 are welded or otherwise attached to studs 14 which extend through openings in the cover 6 and are bolted thereto by nuts 15. The legs 12 and 13 of the brackets 9 are provided with pressed inward tongues 16 which are received within certain of the openings 5, as more particularly shown in Figure 2, so as to inhibit accidental removal of the cover. As shown more particularly in Figure 1 of the drawing, the openings 5 adjacent to the edges of the channel legs are disposed in a row and the brackets 9 on the cover 6 are spaced longitudinally of the cover a distance which is a multiple of the spacing between the openings 5 so that when one bracket is aligned with a set of openings, the other brackets will necessarily also be aligned with openings and these will receive the tongues 16.

In the wiring duct, the inherent resilience of the insulating material of the channel will tend to move the legs 3 and 4 outwardly into engagement with the legs 12 and 13 on the brackets 9. This effect is enhanced by the force exerted on the channel legs by the circuit wiring therebetween. When mounting the cover, the legs 3 and 4 are pressed toward each other and the cover snapped thereon with the bracket legs 12 and 13 embracing the outer surfaces of the channel legs 3 and 4 and with the tongues 16 interlocked with openings in the opposite legs of the channel. To remove the cover 6, the legs 3 and 4 are again pressed toward each other so as to disengage the openings 5 from the tongues 16 and thereafter the cover may be readily bodily removed.

To mount the duct to a supporting surface, such as shown at 17 in the drawing, the bight wall 2 of the channel 1 is provided with a limited number of spaced slots 18 through which extends plastic rivets 19, as more fully shown in Figure 3. These plastic rivets have enlarged heads 21 from which depend spaced legs 22 which normally will pass through the slots 18 and through suitable holes in the support 17. After the plastic rivets are inserted, pins 23 are driven centrally thereof to expand the legs 22 within the mounting holes and thus prevent removal from the support 17.

It will thus be seen that with the cover 6 removed the entire interior of the channel is open for the reception and manipulation of circuit wiring and that the sole attachment for the duct is in the form of an insulating rivet head on the back or bight wall of the duct so that damage to wiring insulation is not likely to result and, in any event, no grounded parts are inside the duct to which exposed wires can make contact. It is also seen that the interlocking cover arrangement provides a simple and economical mounting for the cover which not only secures it against involuntary removal from the duct, but also prevents its sliding longitudinally of the duct under vibration.

While certain prefererd embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A wiring duct for the reception of circuit conductors comprising an elongated channel of insulating material having a substantially U-shaped cross section, the legs of said U having a multiplicity of openings therein for the passage of circuit conductors, an insulating cover closing the open side of said channel, said cover being of U-shape with relatively short legs embracing the relatively long channel legs, and cover mounting brackets attached to said cover and engaging the channel legs, said brackets being substantially U-shaped and spaced longitudinally of the cover with their bights attached to the cover and with their legs embracing the outer surfaces of the channel legs in interlocking relation with certain of said conductor openings.

2. A wiring duct for the reception of circuit conductors comprising an elongated channel of insulating material having a substantially U-shaped cross section, the legs of said U having a multiplicity of openings therein for the passage of circuit conductors, at least certain of said openings in each leg being evenly spaced in a row extending longitudinally of the channel, a cover closing the open side of said channel, cover mounting brackets attached to said cover and engaging the opposite legs of the channel, said brackets being substantially U-shaped with their bights connected to the cover and their legs embracing the channel legs, said brackets being spaced longitudinally of the cover a distance which is the multiple of the space between said openings in said rows, and projections on said bracket legs interlocking with certain of the openings in said rows.

3. A wiring duct for the reception of circuit conductors comprising an elongated channel of insulating material having a substantially U-shaped cross-section, the legs of said U having a multiplicity of openings therein for the passage of circuit conductors, means on the bight of said U-shaped channel for mounting it to a supporting surface, a U-shaped cover of insulating material closing the open side of said channel, metallic mounting brackets for said cover attached to said cover and interlocked with said channels, said mounting brackets being of substantially U-shape and disposed on the underside of the cover with the bracket legs embracing the outer surfaces of the channel legs, and tongues projecting from the inner surfaces of said bracket legs and engaged with certain of said conductor openings in said channel legs in interlocking relation.

4. A wiring duct for the reception of circuit conductors comprising an elongated channel of insulating material having a substantially U-shaped cross section, the legs of said U having a multiplicity of openings therein for the passage of circuit conductors, means on the bight of said U-shaped channel for mounting it to a supporting surface, a U-shaped cover of insulating material closing the open side of said channel, metallic mounting brackets for said cover attached to said cover and interlocked with said channel, said mounting brackets being of substantially U-shape and disposed on the underside of the cover with the bracket legs embracing the outer surfaces of the channel legs, and tongues projecting from the inner surfaces of said bracket legs and engaged with certain of said conductor openings in interlocking relation, the spacing between said cover brackets being a multiple of the spacing between said conductor openings so that said bracket tongues will engage within said conductor openings along the duct.

5. A wiring duct for the reception of circuit conductors, said duct comprising an elongated channel of insulating material having a bottom wall and a pair of spaced side walls which are generally parallel to each other, a plurality of openings in said side walls for the passage of circuit conductors, at least some of the openings in each side wall being evenly spaced longitudinally in a row extending longitudinally of the channel, said evenly spaced openings in one side wall being aligned transversely of said channel with said evenly spaced openings in said other side wall, respectively, a cover closing the open side of said channel, cover mounting brackets attached to said cover in longitudinally spaced relation, each of said brackets being substantially of U-shape having its bight portion connected to the cover and having its leg portions aligned with and engaging said side walls, respectively, said brackets being spaced longitudinally from each other along the cover a distance which is an integral multiple of the distance between adjacent ones of said evenly spaced openings, and each of said brackets having projections on its respective legs interlocked respectively with transversely aligned ones of said evenly spaced openings.

References Cited in the file of this patent

UNITED STATES PATENTS

| | | |
|---|---|---|
| 1,094,109 | Alpaugh | Apr. 21, 1914 |
| 1,189,208 | Hodkinson | June 27, 1916 |
| 1,239,223 | Ross | Sept. 4, 1917 |
| 1,574,297 | Lilleberg | Feb. 23, 1926 |
| 1,986,965 | Frank | Jan. 8, 1935 |
| 2,230,423 | Bessette et al. | Feb. 4, 1941 |
| 2,592,130 | Erb et al. | Apr. 8, 1952 |

FOREIGN PATENTS

| | | |
|---|---|---|
| 685,964 | Great Britain | Jan. 14, 1953 |

OTHER REFERENCES

"Channel Wiring for Machine Tool Control Panels," published in Electrical Manufacturing March 1953 (page 150 relied on). (Copy in the Scientific Library and Div. 69.)

"Plastic Fasteners," published in Fasteners, published by Industrial Fasteners Institute, 1517 Terminal Tower, Cleveland, Ohio (pages 3 and 4 relied on). (Copy in the Scientific Library and Div. 57.)